United States Patent
Fong et al.

(10) Patent No.: US 12,530,829 B2
(45) Date of Patent: Jan. 20, 2026

(54) SYSTEMS AND METHODS FOR GENERATING ANIMATIONS FOR 3D OBJECTS USING MACHINE LEARNING

(71) Applicant: Google LLC, Mountain View, CA (US)

(72) Inventors: Crystal Fong, Belmont, CA (US); Nicholas Wasilewski, San Bruno, CA (US); Douglas Sim Dietrich, Jr., Los Gatos, CA (US)

(73) Assignee: Google LLC, Mountain View, CA (US)

( * ) Notice: Subject to any disclaimer, the term of this patent is extended or adjusted under 35 U.S.C. 154(b) by 188 days.

(21) Appl. No.: 18/370,607

(22) Filed: Sep. 20, 2023

(65) Prior Publication Data

US 2025/0095258 A1 Mar. 20, 2025

(51) Int. Cl.
 *G06T 13/20* (2011.01)
 *G06V 10/70* (2022.01)
 *G06V 20/64* (2022.01)

(52) U.S. Cl.
 CPC .......... *G06T 13/20* (2013.01); *G06V 10/70* (2022.01); *G06V 20/64* (2022.01); *G06T 2213/08* (2013.01)

(58) Field of Classification Search
 None
 See application file for complete search history.

(56) References Cited

U.S. PATENT DOCUMENTS

| 11,127,112 B1* | 9/2021 | Ryden ............... G06T 3/4038 |
| 2022/0230379 A1* | 7/2022 | Shriram ............ G06F 3/0482 |
| 2024/0080427 A1* | 3/2024 | Choi ................. G06V 10/94 |

OTHER PUBLICATIONS

Xu Z, Zhou Y, Kalogerakis E, Landreth C, Singh K. Rignet: Neural rigging for articulated characters. arXiv preprint arXiv: 2005.00559. May 1, 2020. (Year: 2020).*
Ma J, Zhang D. TARig: Adaptive template-aware neural rigging for humanoid characters. Computers & Graphics. Aug. 1, 2023;114: 158-67. (Year: 2023).*

* cited by examiner

*Primary Examiner* — Zhengxi Liu
(74) *Attorney, Agent, or Firm* — Lowenstein Sandler LLP

(57) ABSTRACT

A method includes identifying a first three-dimensional (3D) object comprising a first animation rig covering a first set of features associated with the first 3D object. An indication of the first 3D object is provided as input to a machine-learning model. The machine-learning model is trained to generate, using a second 3D object comprising a second animation rig, an animation sequence for the first 3D object. The second animation rig covers a second set of features associated with the second 3D object and the second set of features comprises the first set of features and one or more additional features. One or more outputs of the machine-learning model is obtained. The one or more obtained outputs comprise a plurality of animation frames reflecting an animation sequence for the first 3D object.

20 Claims, 5 Drawing Sheets

SYSTEMS AND METHODS FOR GENERATING ANIMATIONS FOR 3D OBJECTS USING MACHINE LEARNING

TECHNICAL FIELD

The disclosed implementations relate to methods and systems for generating animations for three-dimensional (3D) objects using machine learning.

BACKGROUND

Three-dimensional modeling refers to the process of developing a mathematical coordinate-based representation of one or more surfaces of an object in three dimensions. The object can be developed using specialized software by manipulating edges, vertices, and polygons in a simulated 3D space. More specifically, 3D objects can represent a physical body using a collection of points in 3D space, connected by various geometric entities such as triangles, lines, curved surfaces, etc. This collection of data can be created manually, algorithmically, or by scanning. The surfaces of the 3D objects can be further defined with texture mapping.

Computer animation refers to the process of digitally generating animation. In an illustrative example, objects are built on the computer monitor and 3D objects are rigged with a virtual skeleton. The limbs, eyes, mouth, clothes, etc. of the object can be moved by the animator on key frames. The differences in appearance between key frames are automatically calculated by the computer and then the animation is rendered.

The 3D objects (still or animated) can be used by certain applications, such as video games in virtual reality (VR), applications in augmented reality (AR), avatars in certain programs, etc. to represent the objects to a user. In an example, a sports game played by a user in a virtual reality environment may require the generation of a virtual field, equipment, and players. In some applications, each object (e.g., each player) includes a polygon mesh (e.g., triangular mesh) having a set of vertices, i.e., points in space that form the polygon (e.g., triangle). Such a polygon mesh involves a large quantity of data that can be stored on a data store and transmitted to the user. Practical implementations of storing and transmitting the polygon mesh data representing a virtual object include compressing the polygon mesh data.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

An aspect of the disclosure provides a computer-implemented method comprising identifying, by a processor, a first three-dimensional (3D) object comprising a first animation rig covering a first set of features associated with the first 3D object; providing an indication of the first 3D object as input to a machine-learning model, wherein the machine-learning model is trained to generate, using a second 3D object comprising a second animation rig, an animation sequence for the first 3D object, wherein the second animation rig covers a second set of features associated with the second 3D object, the second set of features comprising the first set of features and one or more additional features; and obtaining one or more outputs of the machine-learning model, wherein the one or more obtained outputs comprise a plurality of animation frames reflecting an animation sequence for the first 3D object.

A further aspect of the disclosure provides a system comprising: a memory; and a processing device, coupled to the memory, the processing device to perform a method according to any aspect or implementation described herein.

A further aspect of the disclosure provides a non-transitory computer-readable medium comprising instructions that, responsive to execution by a processing device, cause the processing device to perform operations according to any aspect or implementation described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
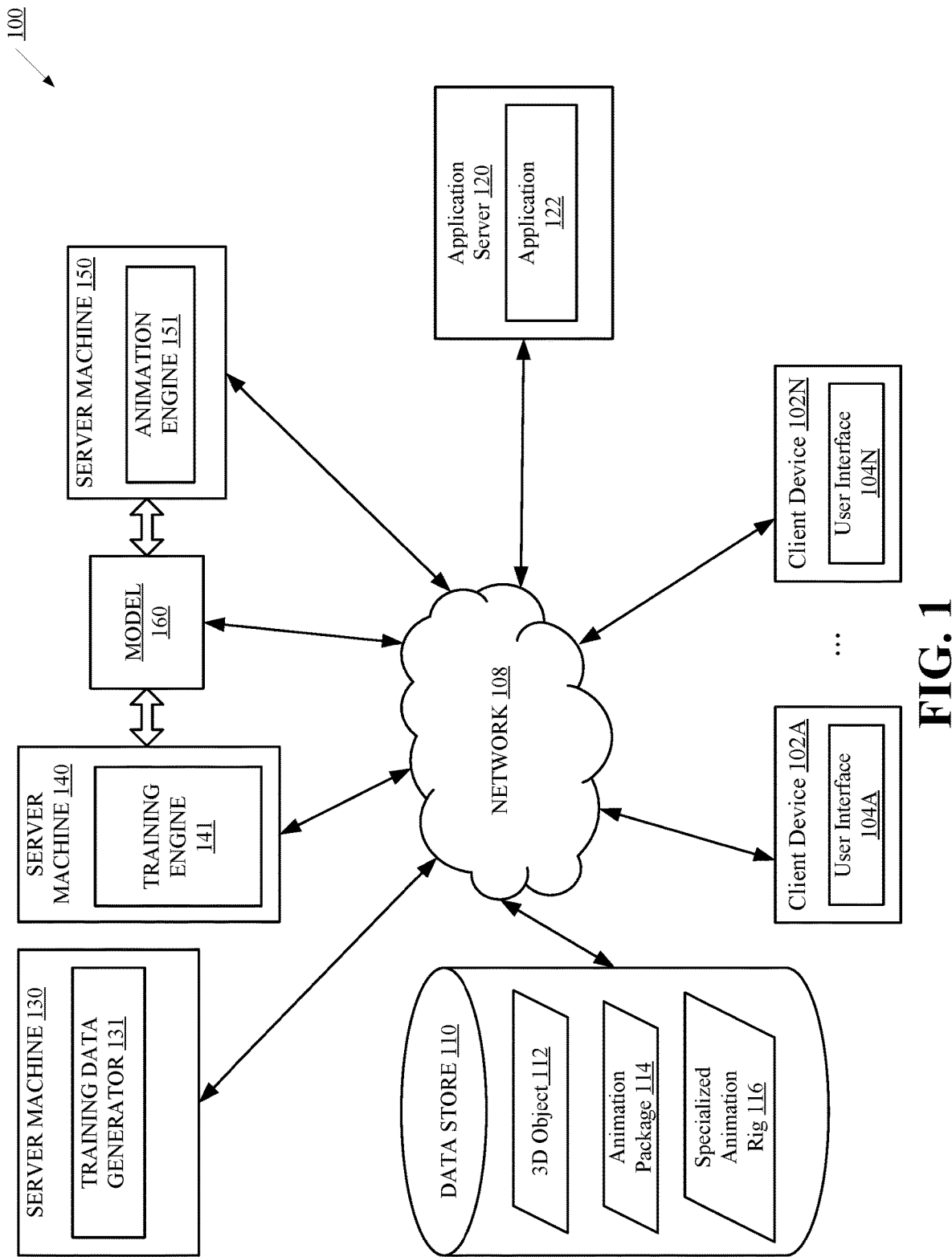
FIG. 1 illustrates an example of system architecture for generating and providing compressed 3D objects, in accordance with implementations of the disclosure.

Skeletal rigging is a technique in computer animation in which a 3D object (such as a character, a car, an animal, a door, etc.) is represented in two parts. The first part includes a surface representation used to draw the 3D object (called the polygon mesh or skin) and the second part includes a hierarchical set of interconnected parts called bones. The polygon mesh can include a collection of vertices, edges and faces that defines the shape of a polyhedral object. Specifically, the polygon mesh can include a set of polygons composed to make up the surface of the object. For example, the data representing an 3D object can include a triangular mesh having a set of vertices that form triangles (and possibly other attributes such as normals, color, lighting, or UV coordinates associated with corresponding texture images). The bones collectively form the skeleton or rig, which is a virtual framework used to animate the vertices of the polygons. The bones can form a hierarchy where each bone can have a three-dimensional transformation from a default pose (which includes its position, scale and orientation), and an optional parent bone. The full transform of a child bone can be the product of the transformation of the parent transform and its own transform. For example, moving a humerus will move the lower arm and hand as well. A rig is generally composed of forward kinematics (the process of determining the position and orientation of an end effector in Cartesian space with the help of the joint angles) and inverse kinematics (the process of calculating the joint angles with the help of the position and orientation of the end-effector) that may interact with each other. Skeletal animation typically refers to the forward kinematics part of the rig, where a complete set of bone configurations identifies a unique pose.

As the 3D object (e.g., a character) is animated, the bones change the object's transformation over time, under the influence of an animation controller. The animation can be composed of keyframes and in-between frames. The keyframes are markers or anchor points that define the start and end points for an action. For example, the keyframes can be the significant poses in a character's action, such as the first and last positions in a jump. In-between frames include the poses between the keyframes. That is, the in-between frames move the animation from one keyframe to another.

Other techniques for computer animation include Blendshape animation, morph target animation, etc. Blendshape animation includes making expressive facial animations in the digital production industry. A Blendshape model is represented as a linear weighted sum of the target faces, which exemplify user-defined facial expressions or approximate facial muscle actions. Morph target animation is a method of 3D computer animation used with techniques such as skeletal animation. In a morph target animation, a "deformed" version of a mesh is stored as a series of vertex positions. In each key frame of an animation, the vertices are then interpolated between these stored positions.

The 3D objects can be used in certain environments, such as video games, virtual reality, movies (e.g., computer generated imagery), augmented reality, avatars, video conferencing, virtual assistants, maps, computer-generated imagery (CGI), etc. In some systems, the 3D objects (e.g., the rigging and animations) can be created in an external modeling and animation application and then exported to a client device.

In certain instances, users (e.g., content creators) may desire to generate one or more 3D objects, such as a non-playable character (NPC), with certain types of predefined motions. These predefined motions can include idle motion, reaction motion, etc. Idle motion can refer to an animation sequence showing subtle motion expressed by a 3D object, typically while the 3D object is in the background or while the 3D object waits for a trigger condition such as an interaction with a playable character. For example, an idle motion for a 3D object relating to a cat can include one or more of the cat's tail swaying, ear twitching, eyes blinking, etc. Reaction motion can refer to an animation sequence performed by a 3D object in response to a trigger condition. For example, a reaction motion for the 3D object reflecting a cat can include a meow, a hiss, running away, etc.

In some systems, a user typically generates animation data for each 3D object. This is a time-consuming and labor-intensive task. Other systems can use a machine-learning model to generate the animation data. However, such systems typically train different machine-learning models to account for different types of 3D objects, which is also time-consuming and resource intensive.

Aspects and implementations of the present disclosure address the above and other deficiencies by providing a system for generating animations for 3D objects using a machine learning model that can be used for different types of 3D objects. In particular, a machine-learning model can be trained to generate animation data for a 3D object. The machine-learning model can be trained using certain media items (e.g., videos), where the media items include objects (e.g., humans, cats, dragons, etc.) expressing a certain type of motion (e.g., idle motion, certain types of desired reaction motions, etc.). For example, the machine-learning model can be trained, using videos of different animals expressing idle motion, to learn relationships between features of different animals and corresponding motions to be able to generate animation data for animals of corresponding types. To generate animation data for a 3D object, an animation engine can provide an indication of the 3D object to the trained machine-learning model. In some implementations, the animation engine can also provide, as input, an object identifier of the 3D object (e.g., whether the 3D object is a cat, a human, etc.). The object identifier can be obtained via, for example, user input, object recognition software, etc. The trained machine-learning model can generate, as output, an animation package (e.g., a set of frames showing an animation of the 3D object) using a specialized animation rig.

The specialized animation rig 116 can be a 3D object having multiple bones and/or sets of bones each related to features of various types of real objects (mammals, insects, reptiles, fish, vehicles, structures, etc.), fictional objects (e.g., dragons, unicorns, aliens, etc.), or any other type of objects. For example, the animation rig can include five pairs of legs, four tails, a pair of dragon wings, a pair of avian wings, ten eyes, three pairs of arms, etc. As shown by example, each feature can relate to a particular body part (such as, for example, an appendage) of an object. To generate the animation package, the trained machine-learning model can identify the features associated with the 3D object (e.g., if a cat, then a tail, four legs, a head, etc.) and generate corresponding animation sequences using the appropriate bones of the specialized animation rig. The machine-learning model can then apply these generated animation sequences to the 3D object to generate the animation package.

Aspects of the present disclosure result in improved performance of modeling and animation tools. In particular, the aspects of the present disclosure enable modeling and animation tools to generate animation data (e.g., an animation package) using a specialized animation rig that can cover objects of different types. As a result, a single machine learning model that is based on the specialized animation rig can be used for different object types (as opposed to separate machine learning models used by conventional systems), and therefore the time and computing resources consumed for generating animation data are significantly reduced. This can improve throughput and conserve the limited computing resources of a computing system. In addition, by generating animation data using the specialized animation rig and applying the animation data from the specialized animation rig to the target 3D object, each target 3D object itself does not need to be animated, thus saving considerable time and computing resources.

FIG. 1 illustrates an example system architecture 100, in accordance with implementations of the present disclosure. The system architecture 100 (also referred to as "system" herein) includes client devices 102A-102N, data store 110, platform 120, and/or server machines 130, 140, 150 each connected to a network 108. In some implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data such as object(s) 112, animation package(s) 114, animation rig 116, as well as data structures to tag, organize, and index the data. Data store 110 can be hosted by one or more storage devices, such as main memory, magnetic or optical storage-based disks, tapes or hard drives, NAS, SAN, and so forth. In some implementations, data store 110 can be a network-attached file server, while in other implementations data store 110 can be some other type of persistent storage such as an object-oriented database, a relational database, and so forth, that may be hosted by application server 120 or one or more different machines (e.g., server machines 130, 140, 150, client device 102A-102N) coupled to the platform 120 via network 108.

In some implementations, application server 120 can host application 122 that provides a user interface 104A-104N for presentation on the client devices 102A-102N. The user interface 104A-104N can be presented via a web browser (not shown). Alternatively, the client device 102A-102N includes a local (mobile or desktop) application (not shown) that provides user interface 104A-104N and communicates with the application 122 via network 108. In the illustrative example, application 122 is a modeling or animation application that enable a user to, via client device 102A-102N, generate and/or edit a 3D object representing a character, a gaming application that allows a user to play or modify a video game, an online platform that allows a user to generate an avatar, etc.

Application 122 can provide one or more 3D objects 112 for display in user interface 104A-104N. Each 3D object 112 can be stored on data store 110. In some implementations, each object 112 can be uploaded to data store 110 by a user, such as a content creator. Applicant 122 can instruct animation engine 151 to generate one or more animation packages for a particular 3D object. In some implementations, an animation package 114 can be used for multiple 3D objects. Each animation package 114 can include data that enables animation of one or more 3D objects 112. In some implementations, each animation package 114 can include two or more keyframes (significant poses in the object's action) and one or more sets of in-between frames (poses between the keyframes). Each animation package 114 can be stored on data store 110 in association with one or more 3D objects. As will be explained in detail below, each animation package 114 can be generated by animation engine 151.

Application server 120 can be a physical machine (e.g., server machine, desktop computer, etc.) that each include one or more processing devices communicatively coupled to one or more memory devices and one or more input/output (I/O) devices. The processing devices can include a computer, microprocessor, logic device or other device or processor that is configured with hardware, firmware, and software to carry out some of the implementations described herein. Application servers 120 can host application 122, which can display 3D objects on one or more user interfaces 104A-104N. Application 122 can be implemented as computer instructions that are executable by one or more processing devices on application server 120.

In some implementations, the user interfaces 104A-104N can be web pages rendered by a web browser and displayed on the client devices 104A-104N in a web browser window. In another implementation, the user interfaces 104A-104N can be provided by a stand-alone application (e.g., a mobile application also referred to as a mobile app) downloaded to the client devices 102A-102N and natively running on the client devices 102A-102N (also referred to as a "native application" or "native client application" herein).

The client devices 102A-102N can include one or more processing devices communicatively coupled to memory devices and I/O devices. The client devices 102A-102N can be desktop computers, laptop computers, tablet computers, mobile phones (e.g., smartphones), or any suitable computing device. The client device 102A-102N can include components, such as an input device and an output device. A user can be authenticated by application server 120 using a username and password (or other identification information) provided by a user via the user interface 102A-102N, such that the same client device 102A-102N can be used by different users at different times.

As discussed above, application 122 can be configured to request, for a 3D object 112, an animation package 114 via animation engine 151. In some implementations, animation engine 151 can generate the animation package using one or more animation machine-learning models 160. For example, application 122 can receive (e.g., from a client device 102A-102N, etc.) a 3D object 112. In response to receiving the 3D object 112, animation engine 151 can provide an indication of the 3D object 112 as input to a trained animation machine-learning model 160. Animation machine-learning model 160 can be trained to predict, for a given object 112, output data that includes an animation package (e.g., a set of animated frames), in accordance with implementations described herein.

Training data generator 131 (i.e., residing at server machine 130) can generate training data to be used to train animation machine-learning model 160. In some implementations, training data generator 131 can generate the training data based on one or more training media items (e.g., stored at data store 110, another data store connected to system 100 via network 104, or an external system). In an illustrative example, data store 110 can be configured to store a set of training media items and metadata associated with each training media item of the set of training media items. In some implementations, the metadata associated with a respective training media item can indicate one or more object identifiers associated with one or more objects of the media item. Each object identifier can describe, identify, and/or label one or more elements of an object in the training media item. For example, if the training media item is a video of a cat, the object identifier can be one or more of "cat," "mammal," "feline," "kitten," etc. In some implementations, the object identifiers can be generated based on user input. For example, for each training media item, one or more users can specify the object identifiers for the related training media item. In some implementations, the object identifiers can be generated automatically via, for example, object recognition software or models. Object recognition is a computer vision technique for identifying objects in images or videos.

Server machine 140 may include a training engine 141. Training engine 141 can train the animation machine-learning model 160 using the training data from training data generator 131 and specialized animation rig 116.

Specialized animation rig 116 can be a 3D object having bones and/or sets of bones each related to features of various types of real objects (mammals, insects, reptiles, fish, vehicles, structures, etc.), fictional objects (e.g., dragons, unicorns, aliens, etc.), or any other type of objects. For example, the specialized animation rig can include five pairs of legs, four tails, a pair of dragon wings, a pair of avian wings, ten eyes, three pairs of arms, and other features. In some implementations, certain similar features can include different bones weights, constraints, and/or association. For example, in the specialized animation rig discussed above, the first tail of the four tails can be associated (via a label, for example) with a feline tail (and have corresponding bone weights and constraints), the second tail can be associated with a reptile tail (and have corresponding bone weights and constraints), the third tail can be associated with a fish tail (and have corresponding bone weights and constraints), and the fourth tail can be associated with a generic tail (and have corresponding bone weights and constraints). Alternatively, each tail can be a generic tail and animated accordingly for a particular 3D object. As such, during training or inference, model 160 can be trained and/or used to obtain output data by animating particular features of the specialized animation rig based on the corresponding objects identified in the training data or based on the target 3D objects. In some implementations, multiple animation rigs can be generated, each having different sets of features for a subset of different object types. For example, a first animation rig can include bones related to certain mammal features (e.g., tails, legs, ears, etc.) corresponding to different mammal animals (e.g., cats, dogs, elephants, etc.) and a second animation rig can include bones related to certain bug features (e.g., stingers, pincers, wings, etc.) corresponding to different bugs (e.g., bees, beetles, butterflies, etc.).

In some implementations, one or more bones of each feature of the specialized animation rig can be attached to one or more 3D object bodies, which can be used as a structural frame for the bones of the features. For example, a generic body (or set of connected bodies) can be generated and the bone(s) of each of the features can be attached as appendages (e.g., limbs) to the generic body (ies). In some implementations, the bones of each feature can be independent from the bones of the other features (e.g., the motion of the bones of one feature does not affect the bones of another feature). In some implementations, the bones of certain features can be dependent on the bones of another feature(s) (e.g., the motion of the bones of one feature affects the motion of the bones of another feature). Some or all of the bones of the specialized animation rig 116 can include a polygon mesh, weights, constraints, etc. Specialized animation rig 116 can be stored on data store 110, on server 120, 130, 140, 150, on client device 102A-102N, or on any other component.

In some implementations, the animation machine-learning model 160 can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the animation machine-learning model 160 that captures these patterns. The animation machine-learning model 160 can be composed of, e.g., a single level of linear or non-linear operations (e.g., a support vector machine (SVM) or may be a deep network, i.e., a machine-learning model that is composed of multiple levels of non-linear operations). An example of a deep network is a neural network with one or more hidden layers, and such a machine-learning model can be trained by, for example, adjusting weights of a neural network in accordance with a backpropagation learning algorithm or the like. In other or similar implementations, the animation machine-learning model 160 can refer to the model artifact that is created by training engine 141 using training data that includes training inputs. Training engine 141 can find patterns in the training data, identify clusters of data that correspond to the identified patterns, and provide the animation machine-learning model 160 that captures these patterns. Machine-learning model 160 can use one or more of support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

In some implementations, different animated machine-learning models 160 can be trained based on a desired motion type (e.g., idle motion, reaction motion, etc.). For example, a first animation machine learning model 160 can be trained to generate animation packages that animate 3D objects with idle motion, while a second animation machine learning model 160 can be trained to generate animation packages that animate 3D objects with a particular type of reaction motion (e.g., attack motions, run motions, etc.). Each of the animated machine-learning models can be associated with a motion type identifier and can be trained using corresponding training data. For example, an idle motion animation machine-learning model 160 can be trained using videos of objects (e.g., people, animals, objects, etc.) expressing idle motion (e.g., a human standing still, a cat sitting, etc.), a reaction motion animation machine-learning model 160 can be trained using videos of objects expressing reaction motions (e.g., a knight performing an attacking action, an bear standing and roaring, etc.), and so forth.

Server machine 150 can include animation engine 151, which can be configured to apply animation machine-learning model 160 to a 3D object 112 to generate prediction data. In particular, animation engine 151 can provide an indication of the 3D object 112, as input, to the animation machine-learning model 160. Animation engine 151 can also provide, as input, an object label and/or a desired duration of the animation, etc. Animation engine 151 can then obtain one or more outputs from animation machine-learning model 160, the one or more outputs reflecting predictive animation frames associated with an object 112. In particular, the animation machine-learning model 160 can provide one or more outputs that include an animation package for the object 112, where the animation package can correspond to a set of frames illustrating a particular animation sequence of the 3D object 112. Animation engine 151 can store the predicted animation package 114 at data store 110. Further details regarding associating animation data with objects are provided herein.

The animation trained machine-learning model 160 can generate the output data based on animation data obtained from the specialized animation rig. In particular, and as will be explained in detail below, animation machine-learning model 160 can be trained to generate, for a 3D object, animation data using one or more features of animation rig 116, then apply the generated animation data obtained from the specialized animation rig to a 3D object to generate a set of animation frames as output.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
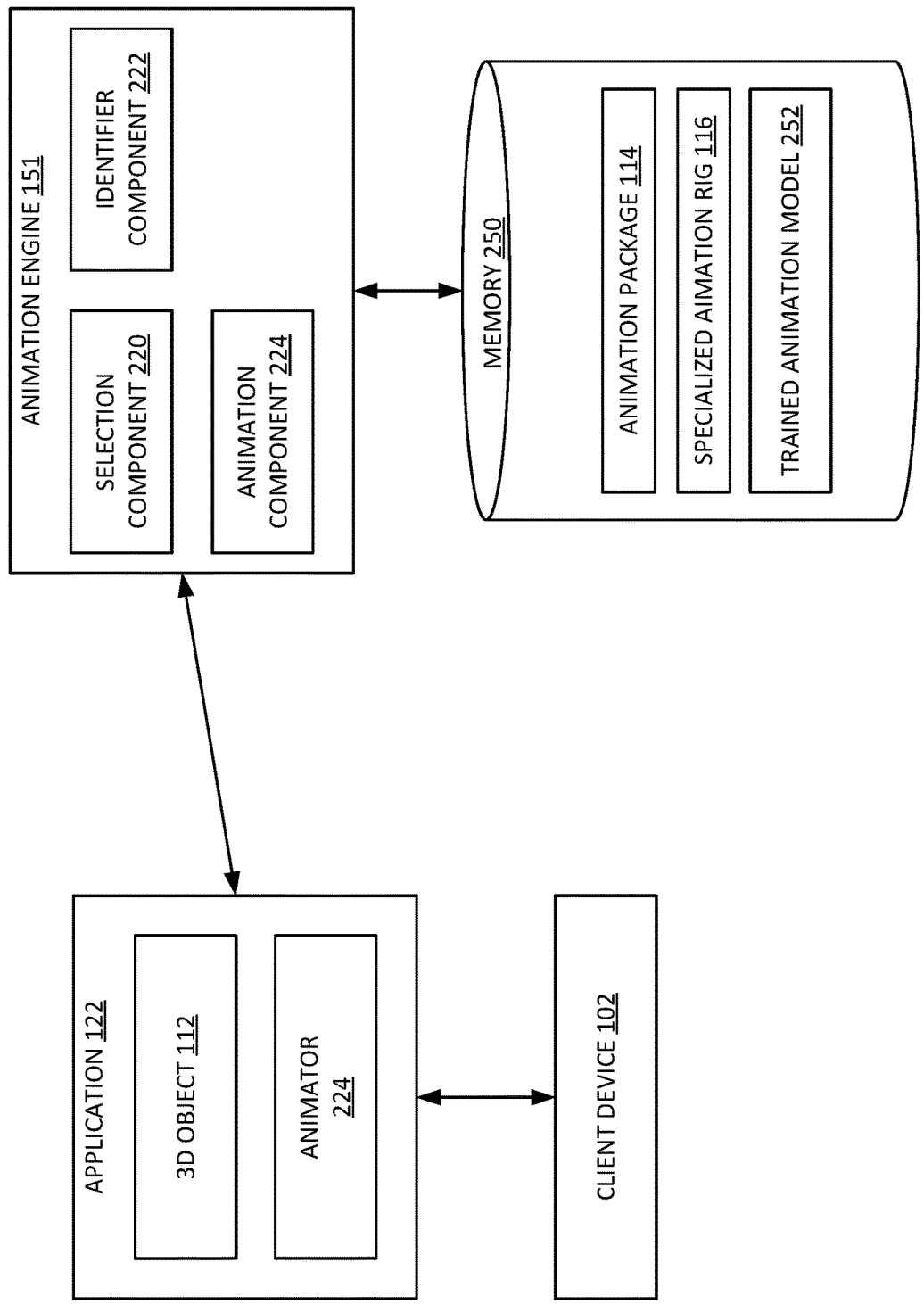
FIG. 2 depicts a computer system in accordance with implementations of the disclosure.

FIG. 2 is a block diagram illustrating an example application 122 and an example animation engine 151, in accordance with implementations of the present disclosure. In some implementations, application 122 and/or animation engine 151 can be connected to memory 250. One or more portions of memory 250 can correspond to data store 110 and/or another memory of system 100, in some implementations. In additional or alternative implementations, one or more portions of memory 250 can correspond to a memory of client device 102.

As described with respect to FIG. 1, application 122 can provide users with access to objects 112. In some implementations, objects 112 can be generated by application 122. In other implementations, objects 112 can be provided to application 122 by other applications. As described above, a user can access object 112 via a user interface (e.g., user interface 104A-104N) of client device 102. Application 122 can include animator 124, which can be a feature, component, add-on, separate application or any other type of software configured to generate, via animation engine 151, one or more animation packages 114 for 3D objects 112. In some implementations, animator 124 can instruct animation engine 151 to generate one or more animation packages, provide animation engine 151 with one or more 3D objects, provide animation engine 151 with one or more object identifiers, instruct animation engine 151 which type of motion to generate (e.g., idle motion, reaction motion, etc.), and so forth.

In some implementations, animation engine 151 can include selection component 220, identifier component 222, and animation component 224. Selection component 220 can be configured to select or identify a 3D object 112 for which to generate an animation package. In some implementations, a creator of 3D object 112 can provide 3D object 112 to animation engine 151. In some implementations, selection component 220 can retrieve 3D object 112 from memory 250, application 112, or another location. In response to obtaining 3D object 112, identifier component 222 can identify the type of object that 3D object 112 represents (e.g., a cat, a human, a dragon, etc.). In some implementations, identifier component 222 can identify the object type in response to receiving user input identifying the object (e.g., a label). In some implementations, identifier component 222 can identify the object using software, an application, another trained machine-learning model, etc. For example, identifier component 222 can identify the object using object recognition software.

Animation component 224 can generate one or more animation packages for the 3D object 112. For example, in response to selection component 220 selecting a 3D object and/or identifier component 222 identifying the 3D object, animation component 224 can provide an indication of the 3D object and its identity as input to trained animation model 252. Trained animation model 252 can correspond to one or more of machine-learning model(s) 160, described with respect to FIG. 1. In some implementations, trained animation model 252 can be trained to generate, for a given 3D object, one or more distinct animation packages of the given 3D object. In some implementations, trained animation model 252 can be trained in accordance with implementations described above and with respect to FIG. 3, in some implementations. In some implementations, trained animation model 252 can be trained to predict a certain type of animation or motion (e.g., idle motion, reaction motion, etc.). Animation engine 151 (or any component of animation engine 151) can select which model 160 to use based on, for example, user input, the type of 3D object, metadata appended to the 3D object, etc. For example, animation engine 151 can receive user input requesting idle motion animation for object 112. The one or more generated animation packages can be presented as an animated 3D object to one or more users of application 122 (or other applications).

In response to providing an indication of 3D object 112 (and/or one or more identifiers of the 3D object) as input to trained animation model 252, animation component 224 can obtain one or more outputs of model 252. As indicated above, the one or more outputs can include one or more animation packages related to 3D object 112 (e.g., an animation related to idle motion). Accordingly, animation component 224 can determine a set of frames reflecting an animation of the 3D object. Animation component 224 can store an indication of the assigned animation package at memory 250. To generate the animation package, trained animation model 252 can identify one or more features of the specialized animation rig based on the type (or features) of the 3D object used as input, generate animation data by animating the appropriate features of the specialized animation rig, and apply the animation data to the 3D object.

Figure 3:
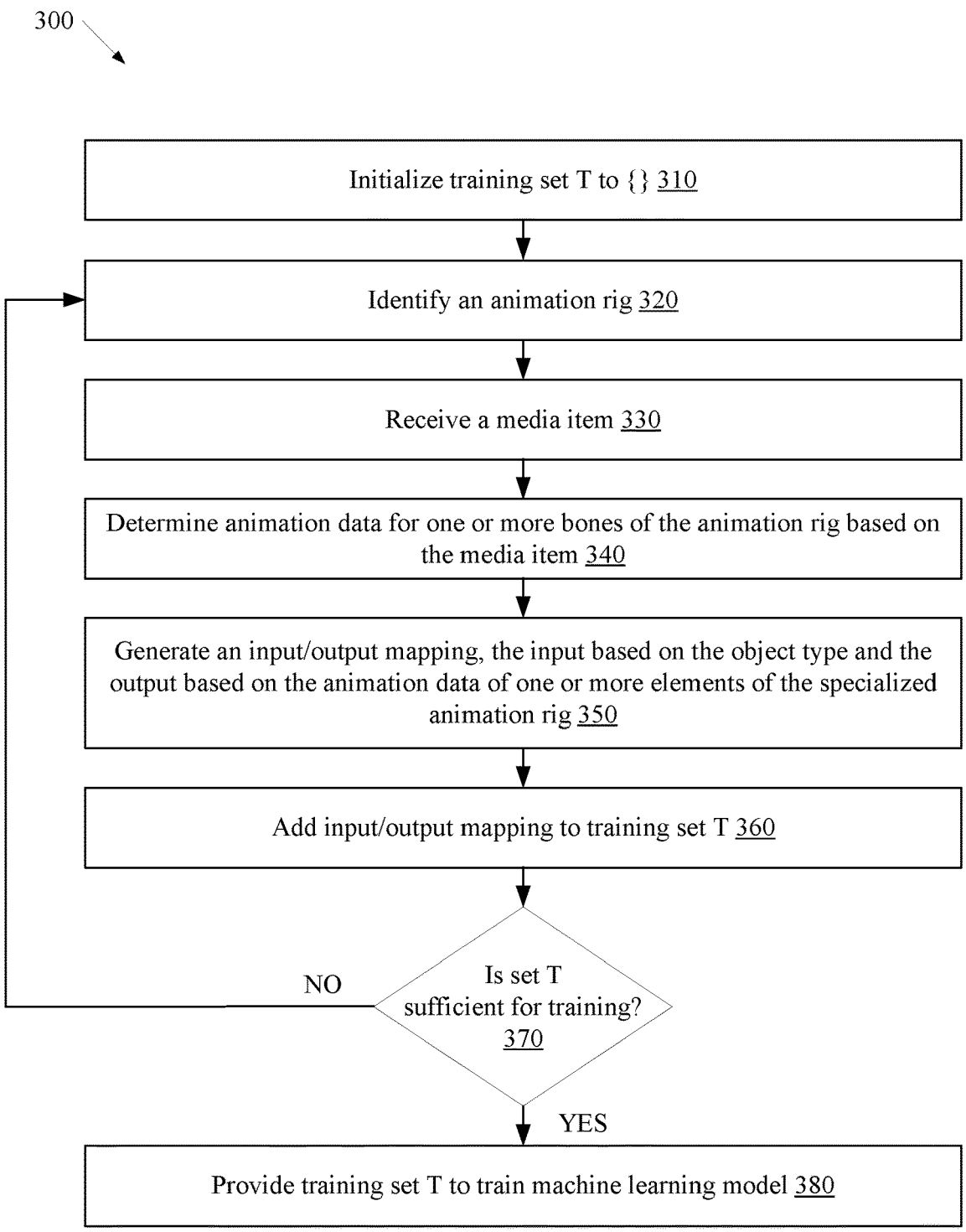
FIG. 3 depicts a flow diagram of an example method for training an animated machine-learning model to generate an animation package for a given 3D object, in accordance with implementations of the disclosure.

FIG. 3 depicts a flow diagram of an example method 300 for training an animated machine-learning model to generate an animation package for a given 3D object, in accordance with implementations of the present disclosure. Method 300 can be performed by processing logic that can include hardware (circuitry, dedicated logic, etc.), software (e.g., instructions run on a processing device), or a combination thereof. In one implementation, some or all of the operations of method 300 can be performed by one or more components of system 100 of FIG. 1. In some implementations, some or all of the operations of method 300 can be performed by training data generator 131 and/or training engine 141, as described above.

At operation 310, processing logic initiates training set T to { } (e.g., to empty).

At operation 320, processing logic identifies an animation rig. The animation rig can correspond to animation rig 114, as described above. The animation rig can cover a set of features, each feature having one or more bones.

At operation 330, processing logic receives a media item. In some implementations, the media item can relate to a video depicting an object expressing a motion. For example, the video can depict a cat sitting. In some implementations, the processing logic can also receive one or more object identifiers associated with the video. The identifier(s) can indicate, for example, that the object of the video is a cat.

At operation 340, processing logic determines animation data for one or more bones of the animation rig based on the media item. In some implementations, the processing logic can identify one or more features (e.g., appendages) of the object of the training video, and animate a corresponding appendage of the animation rig in a similar manner. For example, if the cat in the video is wagging its tail, the processing logic can animate a tail of the specialized animation rig in a similar manner.

At operation 350, processing logic generates an input/output mapping, the input based on the object type and the output based on the animation data of one or more features of the specialized animation rig.

At operation 360, processing logic adds the input/output mapping to training set T.

At operation 370, processing logic determines whether set T is sufficient for training. In response to processing logic determining that set T is not sufficient for training, method 300 can return to block 320. In response to processing logic determining that set T is sufficient for training, method 300 can proceed to block 380.

At operation 380, processing logic provides training set T to train a machine-learning model, such as animation machine-learning model 160 and/or 252, as described above.

Once processing logic provides the training set T to train the machine-learning model, the machine-learning model can be trained to generate, for a given 3D object, animation data using the specialized animation rig and apply the animation data to the 3D object to generate one or more distinct animation packages for the 3D object.

Figure 4:
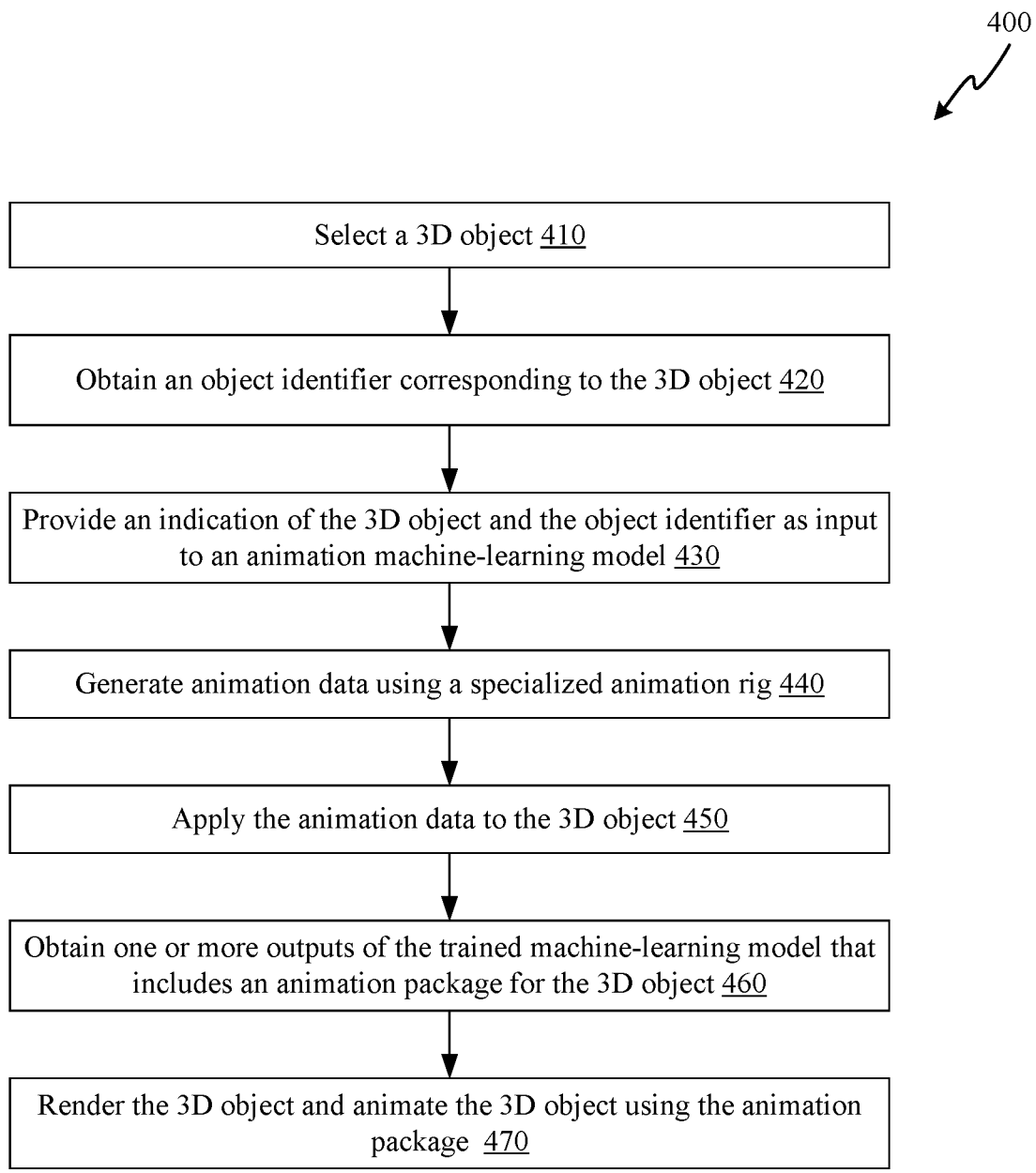
FIG. 4 depicts a flow diagram of an example method for generating an animation package for a 3D object using the animated machine-learning model, in accordance with implementations of the disclosure.

FIG. 4 depicts a flow diagram of an example method 400 for generating an animation package for a 3D object using the animated machine-learning model, in accordance with implementations of the present disclosure. Method 400 can be performed by processing logic that can include hardware (circuitry, dedicated logic, etc.), software (e.g., instructions run on a processing device), or a combination thereof. In one implementation, some or all of the operations of method 400 can be performed by one or more components of system 100 of FIG. 1. In some embodiments, some or all of the operations of method 400 can be performed by animation engine 151, as described above.

At operation 410, processing logic selects a 3D object. In some embodiments, the 3D object (e.g., 3D object 112) can be provided or identified by a user. The 3D object can include an animation rig covering a certain set of features (e.g., paws, arms, tails, etc.) corresponding to the 3D object (e.g., a cat, a human, etc.).

At operation 420, processing logic obtains an object identifier corresponding to the 3D object. The object identifier can identify the object type of the 3D object. In some embodiments, processing logic can receive the object identifier from a client device. In some implementations, the processing logic can automatically generate an object identifier using, for example, object recognition software or models.

At operation 430, the processing logic provides an indication of the 3D object and the object identifier as input to an animation machine-learning model. The animation machine-learning model (e.g., model 160, 252) can be trained via, for example, method 300 of FIG. 3.

At operation 440, processing logic, via the trained machine-learning model, generates animation data using a specialized animation rig. The specialized animation rig can cover feature from multiple types of objects (e.g., multiple types of animals, creatures, etc.) The animation data can be generated using one or more features of the specialized animation rig, which can be selected based on the object type of the 3D object. The animation data can include an animation sequence of a predetermined length.

At operation 450, processing logic, via the trained machine-learning model, applies the animation data to the 3D object. For example, responsive to the 3D object being a cat, the processing logic can generate animation data using a tail, four legs, a body, and a head of the specialized animation rig. Processing logic can then apply this animation data to the 3D object.

At operation 460, processing logic obtains one or more outputs of the trained machine-learning model that includes an animation package for the 3D object. The animation package can include a set of frames showing an animation of the 3D object. The animation package can be stored on a data store.

At operation 470, processing logic renders (e.g., provides for presentation on a user interface of a client device) the 3D object and animates the 3D object using the animation package. The 3D object can then be rendered with the animation package to show the 3D object expressing a type of motion (e.g., an idle motion).

Figure 5:
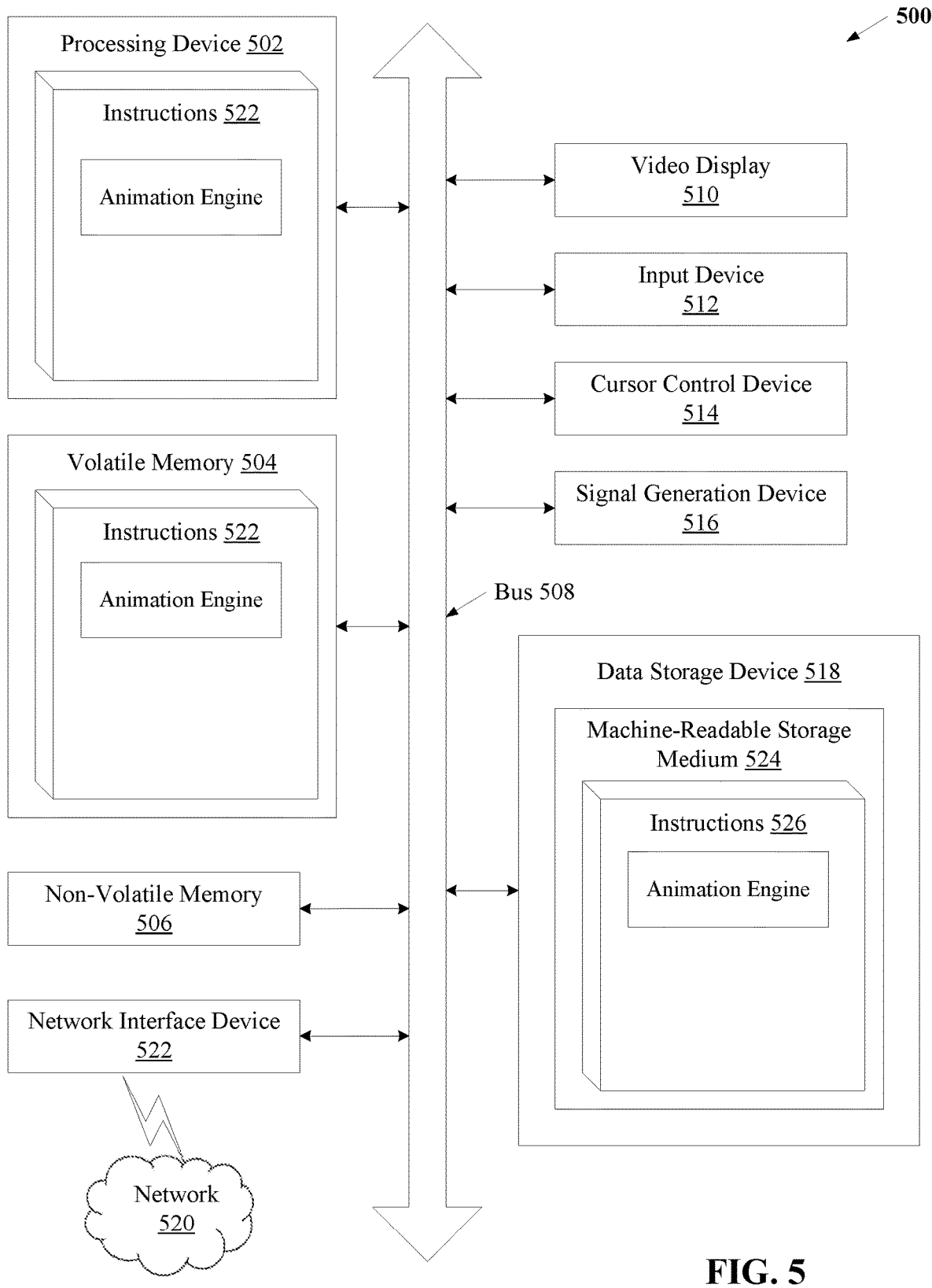
FIG. 5 depicts a block diagram of an example computing device operating in accordance with one or more aspects of the present disclosure.

FIG. 5 depicts a block diagram of a computer system operating in accordance with one or more aspects of the present disclosure. In certain implementations, computer system 500 can be connected (e.g., via a network, such as a Local Area Network (LAN), an intranet, an extranet, or the Internet) to other computer systems. Computer system 500 can operate in the capacity of a client device. Computer system 500 can operate in the capacity of a server or a client computer in a client-server environment. Computer system 500 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 can include a processing device 502, a volatile memory 504 (e.g., random access memory (RAM)), a non-volatile memory 506 (e.g., read-only memory (ROM) or electrically erasable programmable ROM (EEPROM)), and a data storage device 518, which can communicate with each other via a bus 508.

Processing device 502 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 can further include a network interface device 522. Computer system 500 also can include a video display unit 510 (e.g., an LCD), an input device 512 (e.g., a keyboard, an alphanumeric keyboard, a motion sensing input device, touch screen), a cursor control device 514 (e.g., a mouse), and a signal generation device 516.

Data storage device 518 can include a non-transitory machine-readable storage medium 524 on which can store instructions 526 encoding any one or more of the methods or functions described herein, including instructions encoding components of client device of FIG. 1 for implementing methods 300 and 400.

Instructions 526 can also reside, completely or partially, within volatile memory 504 and/or within processing device 502 during execution thereof by computer system 500, hence, volatile memory 504 and processing device 502 can also constitute machine-readable storage media.

While machine-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "determining," "sending," "displaying," "identifying," "selecting," "excluding," "creating," "adding," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can comprise a general-purpose computer system selectively programmed by a computer program stored in the computer system. Such a computer program can be stored in a computer-readable tangible storage medium.

The methods and illustrative examples described herein are not inherently related to any particular computer or other apparatus. Various general-purpose systems can be used in accordance with the teachings described herein, or it can prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying, by a processor, a first three-dimensional (3D) object comprising a corresponding animation rig comprising a first set of features associated with the first 3D object's type, wherein the first 3D object's type is a first type of real or fictional object;
   providing the identified first 3D object as input to a machine-learning model,
      wherein the machine-learning model is trained to generate, using a second 3D object comprising a specialized animation rig, an animation sequence for the first 3D object,
      wherein the specialized animation rig comprises a second set of features associated with the second 3D object's type,
      wherein the second 3D object's type is a second type of real or fictional object,
      wherein the specialized animation rig further comprises the first set of features,
      wherein the first type is different from the second type,
      wherein the first set of features and the second set of features share a common feature, and the common feature is separately represented in the specialized animation rig for the first type and for the second type, and
      wherein each separate representation of the common feature in the specialized animation rig comprises one or more of weights and one or more constraints; and
   obtaining one or more outputs of the machine-learning model, wherein the one or more obtained outputs comprise a plurality of animation frames reflecting an animation sequence for the first 3D object.

2. The method of claim 1, further comprising:
   receiving, from a client device, a request to present, on a user interface, the animation sequence for the 3D object; and
   providing, to the client device, the plurality of animation frames for presentation.

3. The method of claim 1, wherein the first set of features comprises a first set of bones and the second set of features comprises a second set of bones, wherein a number of bones in the second set is greater than a number of bones in the first set.

4. The method of claim 3, wherein the machine-learning model generates the plurality of animation frames by animating a subset of bones from the second set of bones and applying resulting animation data to the bones of the first 3D object.

5. The method of claim 1, wherein the second 3D object comprises features from at least one type of real object and one type of fictional object.

6. The method of claim 1, wherein the machine-learning model is trained to generate an animation sequence based on at least one of an idle motion or a reaction motion.

7. The method of claim 1, further comprising:
   providing, as input to the machine-learning model, an identifier associated with the first 3D object.

8. The method of claim 7, wherein the identifier is determined using object recognition software.

9. The method of claim 1, wherein the machine-learning model is trained based on the second 3D object and a plurality of media items.

10. A system comprising: a memory; and a processing device, coupled to the memory, the processing device to perform operations comprising:
    identifying, by a processor, a first three-dimensional (3D) object comprising a corresponding animation rig comprising a first set of features associated with the first 3D object's type, wherein the first 3D object's type is a first type of real or fictional object;

providing the identified first 3D object as input to a machine-learning model,
    wherein the machine-learning model is trained to generate, using a second 3D object comprising a specialized animation rig, an animation sequence for the first 3D object,
    wherein the specialized animation rig comprises a second set of features associated with the second 3D object's type,
    wherein the second 3D object's type is a second type of real or fictional object,
    wherein the specialized animation rig further comprises the first set of features,
    wherein the first type is different from the second type,
    wherein the first set of features and the second set of features share a common feature, and the common feature is separately represented in the specialized animation rig for the first type and for the second type, and
    wherein each separate representation of the common feature in the specialized animation rig comprises one or more of weights and one or more constraints; and obtaining one or more outputs of the machine-learning model, wherein the one or more obtained outputs comprise a plurality of animation frames reflecting an animation sequence for the first 3D object.

11. The system of claim 10, wherein the operations further comprise:
receiving, from a client device, a request to present, on a user interface, the animation sequence for the 3D object; and
providing, to the client device, the plurality of animation frames for presentation.

12. The system of claim 10, wherein the first set of features comprises a first set of bones and the second set of features comprises a second set of bones, wherein a number of bones in the second set is greater than a number of bones in the first set.

13. The system of claim 12, wherein the machine-learning model generates the plurality of animation frames by animating a subset of bones from the second set of bones and applying resulting animation data to the bones of the first 3D object.

14. The system of claim 10, wherein the second 3D object comprises features from at least one type of real object and one type of fictional object.

15. The system of claim 10, wherein the machine-learning model is trained to generate an animation sequence based on at least one of an idle motion or a reaction motion.

16. The system of claim 10, wherein the operations further comprise:
providing, as input to the machine-learning model, an identifier associated with the first 3D object.

17. The system of claim 16, wherein the identifier is determined using object recognition software.

18. The system of claim 16, wherein the machine-learning model is trained based on the second 3D object and a plurality of media items.

19. A non-transitory computer-readable medium comprising instructions that, responsive to execution by a processing device, cause the processing device to perform operations comprising:
identifying, by a processor, a first three-dimensional (3D) object comprising a corresponding animation rig comprising a first set of features associated with the first 3D object's type, wherein the first 3D object's type is a first type of real or fictional object;
providing the identified first 3D object as input to a machine-learning model,
    wherein the machine-learning model is trained to generate, using a second 3D object comprising a specialized animation rig, an animation sequence for the first 3D object,
    wherein the specialized animation rig comprises a second set of features associated with the second 3D object's type,
    wherein the second 3D object's type is a second type of real or fictional object,
    wherein the specialized animation rig further comprises the first set of features,
    wherein the first type is different from the second type,
    wherein the first set of features and the second set of features share a common feature, and the common feature is separately represented in the specialized animation rig for the first type and for the second type, and
    wherein each separate representation of the common feature in the specialized animation rig comprises one or more of weights and one or more constraints; and
obtaining one or more outputs of the machine-learning model, wherein the one or more obtained outputs comprise a plurality of animation frames reflecting an animation sequence for the first 3D object.

20. The non-transitory computer readable storage medium of claim 19, wherein the first set of features comprises a first set of bones and the second set of features comprises a second set of bones, wherein a number of bones in the second set is greater than a number of bones in the first set.

* * * * *